United States Patent
Mouri et al.

(10) Patent No.: US 12,139,067 B2
(45) Date of Patent: Nov. 12, 2024

(54) VEHICULAR DRAWING DEVICE

(71) Applicants: TOYOTA JIDOSHA KABUSHIKI KAISHA, Aichi-ken (JP); STANLEY ELECTRIC CO., LTD., Tokyo (JP)

(72) Inventors: Fumihiko Mouri, Owariasahi (JP); Kentaro Mori, Nissin (JP)

(73) Assignees: TOYOTA JIDOSHA KABUSHIKI KAISHA, Aichi-ken (JP); STANLEY ELECTRIC CO., LTD., Tokyo (JP)

( * ) Notice: Subject to any disclaimer, the term of this patent is extended or adjusted under 35 U.S.C. 154(b) by 107 days.

(21) Appl. No.: 18/053,758

(22) Filed: Nov. 9, 2022

(65) Prior Publication Data

US 2023/0150422 A1 May 18, 2023

(30) Foreign Application Priority Data

Nov. 18, 2021 (JP) ................. 2021-187885

(51) Int. Cl.
*B60Q 1/34* (2006.01)
*B60Q 1/12* (2006.01)

(52) U.S. Cl.
CPC ............... *B60Q 1/34* (2013.01); *B60Q 1/12* (2013.01); *B60Q 2400/50* (2013.01)

(58) Field of Classification Search
CPC ... B60Q 1/00; B60Q 1/06; B60Q 1/18; B60Q 1/34; B60Q 1/346; B60Q 1/50; B60Q 1/507; B60Q 1/543; B60Q 1/12; F21S 43/50; G02B 27/01; G02B 27/0101; G08G 1/165; G08G 1/166
See application file for complete search history.

(56) References Cited

U.S. PATENT DOCUMENTS

| | | | |
|---|---|---|---|
| 2003/0067763 A1* | 4/2003 | Fukawa | B60Q 1/18 362/40 |
| 2020/0070716 A1 | 3/2020 | Sakata et al. | |
| 2020/0384913 A1* | 12/2020 | Nobuhara | B60K 35/29 |
| 2022/0381415 A1* | 12/2022 | Tatara | G02B 27/0101 |

FOREIGN PATENT DOCUMENTS

| | | |
|---|---|---|
| EP | 3858672 A1 | 8/2021 |
| JP | 2020-055519 A | 4/2020 |
| WO | 2018/138842 A1 | 8/2018 |
| WO | 2021006217 A1 | 1/2021 |

OTHER PUBLICATIONS

NPL Search (Apr. 21, 2024).*

* cited by examiner

*Primary Examiner* — Van T Trieu
(74) *Attorney, Agent, or Firm* — HAUPTMAN HAM, LLP

(57) ABSTRACT

A vehicular drawing device is installed in the vehicle and draws, using light, an indication display with a predetermined shape on a road surface in a direction of travel of the vehicle. The indication display includes a start-traveling display drawn at a time of starting traveling and a turn indication display drawn when a turn indicator switch is turned on and the direction of travel is changed. The turn indication display is drawn with priority over the start-traveling display when the turn indicator switch is on at the time of starting traveling.

9 Claims, 4 Drawing Sheets

VEHICULAR DRAWING DEVICE

CROSS-REFERENCE TO RELATED APPLICATION

This application claims priority to Japanese Patent Application No. 2021-187885 filed on Nov. 18, 2021, incorporated herein by reference in its entirety.

BACKGROUND

1. Technical Field

The disclosure relates to a vehicular drawing device, which is installed in the vehicle and draws, using light, indication displays of predetermined shapes on a road surface in a direction of travel of the vehicle.

2. Description of Related Art

Vehicles are each equipped with a turn indicator switch, and when changing directions, a driver of the vehicle operates the turn indicator switch to cause right turn indicator lamps or left turn indicator lamps to blink, thereby informing other vehicles, pedestrians, and so forth of the intended direction of travel of the vehicle. Also, some vehicles emit audio regarding the direction of travel when turning right or left, or emit characteristic audio when traveling in reverse, so as to inform pedestrians and so forth of the intended direction of travel of the vehicle.

Now, technology has also been proposed to display an indication display on a road surface in the direction of travel of the vehicle when turning right or left, and further, to draw a pattern having a predetermined shape on the road surface when the vehicle starts traveling from a stopped state (see WO2021/006217).

SUMMARY

Drawing on the road surface can make the display relatively large and easy to visually recognize. However, in a situation in which a turn indicator lever is operated at the time of starting traveling, both the display indicating turning right or left, and the display indicating starting traveling will be displayed on the road surface, which may make the display confusing.

A vehicular drawing device according to a first aspect of the disclosure is installed in the vehicle and draws, using light, an indication display with a predetermined shape on a road surface in a direction of travel of the vehicle and includes a processor. The indication display includes a start-traveling display that is drawn at a time of starting traveling, and a turn indication display that is drawn when a turn indicator switch is turned on and a direction of travel is changed. The processor is configured to draw the turn indication display with priority over the start-traveling display when the turn indicator switch is on at the time of starting traveling.

In the vehicular drawing device according to the above aspect, when drawing the turn indication display with the priority given to the turn indication display, the processor may cancel drawing of the start-traveling display or may draw the start-traveling display as an inconspicuous display.

In the vehicular drawing device according to the above aspect, when drawing the turn indication display with the priority given to the turn indication display, the processor may change the degree of inconspicuousness in drawing of the start-traveling display in accordance with a steering angle.

In the vehicular drawing device according to the above aspect, the processor may draw the start-traveling display as the inconspicuous display by at least one of brightness, saturation, hue, and blinking.

An vehicular drawing device according to a second aspect of the disclosure is installed in the vehicle and draws, using light, an indication display with a predetermined shape on a road surface in a direction of travel of the vehicle and includes a processor. The indication display includes a start-traveling display that is drawn at a time of starting traveling, and a turn indication display that is drawn when a turn indicator switch is turned on and a direction of travel is changed. The processor is configured to change a direction of a distal end of the start-traveling display in accordance with the direction of travel indicated by the turn indicator switch when the turn indicator switch is on at the time of starting traveling.

According to the disclosure, even when the turn indicator switch is turned on at the time of starting traveling, an appropriate indication display can be made on the road surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described below with reference to the drawings. Note that the disclosure is not limited to the embodiment described below.

Overall Configuration

Figure 1:
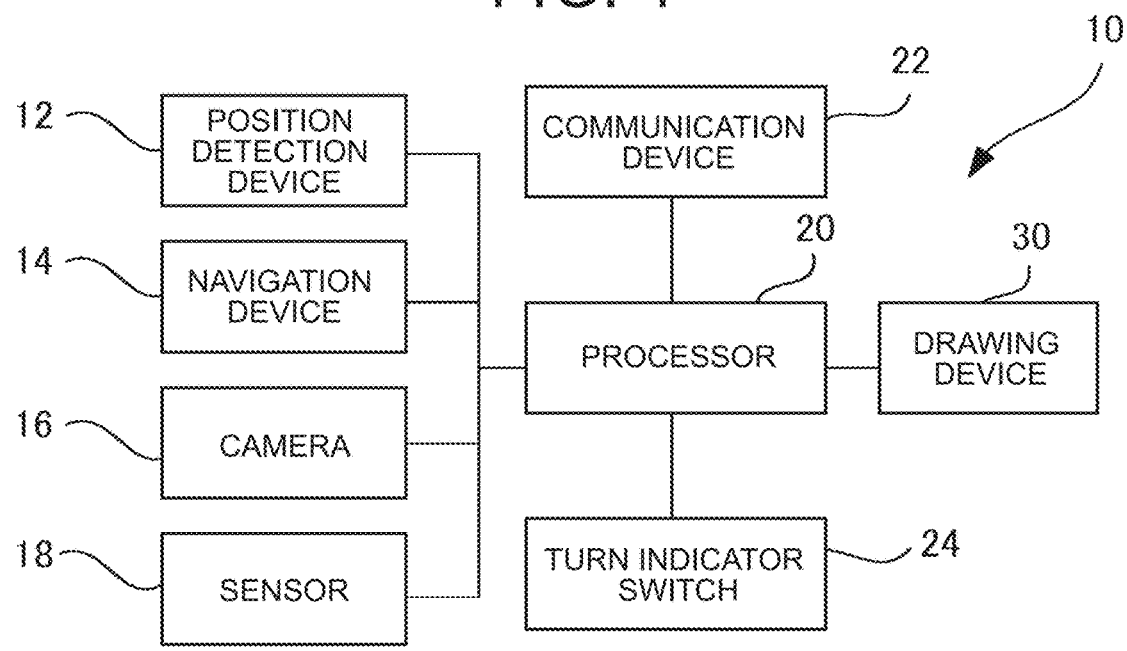
FIG. 1 is a block diagram illustrating a configuration of a vehicular drawing device 10 according to an embodiment.

FIG. 1 is a block diagram illustrating a configuration of a vehicular drawing device 10 according to the embodiment.

The vehicular drawing device 10 is installed in the vehicle, and draws an indication display regarding a direction of travel on a road surface in the vicinity of the vehicle.

A position detection device 12 uses a global navigation satellite system (GNSS) such as the Global Positioning System (GPS) or the like to detect the position of the vehicle in which it is installed. The position detection device 12 may obtain position information from communication equipment (e.g., beacon) installed at intersections or the like, and information from traffic management centers and other vehicles and so forth by communication, and may refer to the state of travel of the vehicle, images of the surroundings, and so forth.

A navigation device 14 has a map database, and assists in travel of the vehicle by displaying maps on a display, displaying the position of the vehicle on the map display, displaying routes obtained by searching for routes to a destination, obtaining traffic congestion information and changing routes, and so forth.

A camera 16 obtains images of the surroundings of the vehicle in order to assist with the traveling of the vehicle. Video signals are obtained by an imaging device such as a charge coupled device (CCD), a complementary metal-oxide semiconductor (CMOS), or the like.

A sensor 18 detects the state of the vehicle, and includes a vehicle speed sensor, a brake sensor, an accelerator sensor, a steering amount sensor, a shift position sensor, a parking brake sensor, and so forth. The vehicle speed sensor detects vehicle speed from rotation speed of a drive shaft, the brake sensor detects depression of a brake pedal, the accelerator sensor detects depression of an accelerator pedal, the shift position sensor detects a shift position based on operation of a shift lever (e.g., the shift lever positions of park, reverse, drive, low, etc.), and the parking brake sensor detects the operating state of a parking brake (also referred to as "side brake").

A turn indicator switch 24 generates right/left turn signals in accordance with operations performed by the driver. The signals from the turn indicator switch 24 causes corresponding turn indicator lamps to blink. That is to say, when the course is to be changed to the right, a right turn indicator lamp is made to blink, and when the course is to be changed to the left, a left turn indicator lamp is made to blink.

The signals from the position detection device 12, the navigation device 14, the camera 16, the sensor 18, and the turn indicator switch 24 are supplied to a processor 20. The processor 20 is made up of a computer having a computation unit such as a central processing unit (CPU) and a storage unit such as random-access memory (RAM), read-only memory (ROM), and so forth, and executes various kinds of programs stored in the storage unit to perform various kinds of data processing.

In this example, the processor 20 detects starting traveling from detection results of the brake sensor, a parking sensor, and the shift position sensor, to control the start-traveling display, and to draw a turn indication display of a predetermined shape on the road surface in accordance with signals from the turn indicator switch 24.

A communication device 22 is connected to the processor 20. The communication device 22 performs various kinds of wireless communication with one or more external communication equipment. Data required for the navigation device 14 and the position detection device 12, images of the surrounding environment, information regarding traveling statuses of other vehicles, and so forth, can also be acquired via the communication device 22.

A drawing device 30 is connected to the processor 20. The drawing device 30 draws indication displays having predetermined shapes indicating the direction of travel on the road surface. In addition to projecting images using light from LEDs or the like, such as with liquid crystal display (LCD), digital light processing (DLP), or liquid crystal on silicon (LCOS) kind liquid crystal projectors, for example, the drawing device 30 can use a light source such as a normal headlamp for projecting, using a lens. Various kinds of devices can be used as the drawing device 30, as long as the devices are capable of drawing on the road surface.

The drawing device 30 projects an indication display on the road surface indicating starting traveling at the time of starting traveling, and in a state in which a right-direction signal is being output from the turn indicator switch 24 and the right-direction turn indicator lamp is blinking, the drawing device 30 projects, from the front of the vehicle, a display such as an arrow indicating that the vehicle will be traveling in the right direction (or the left direction), an arrow indicating the predicted path of travel, or the like, on the road surface ahead of the vehicle, for example.

Turn Indication Display

Figure 2:
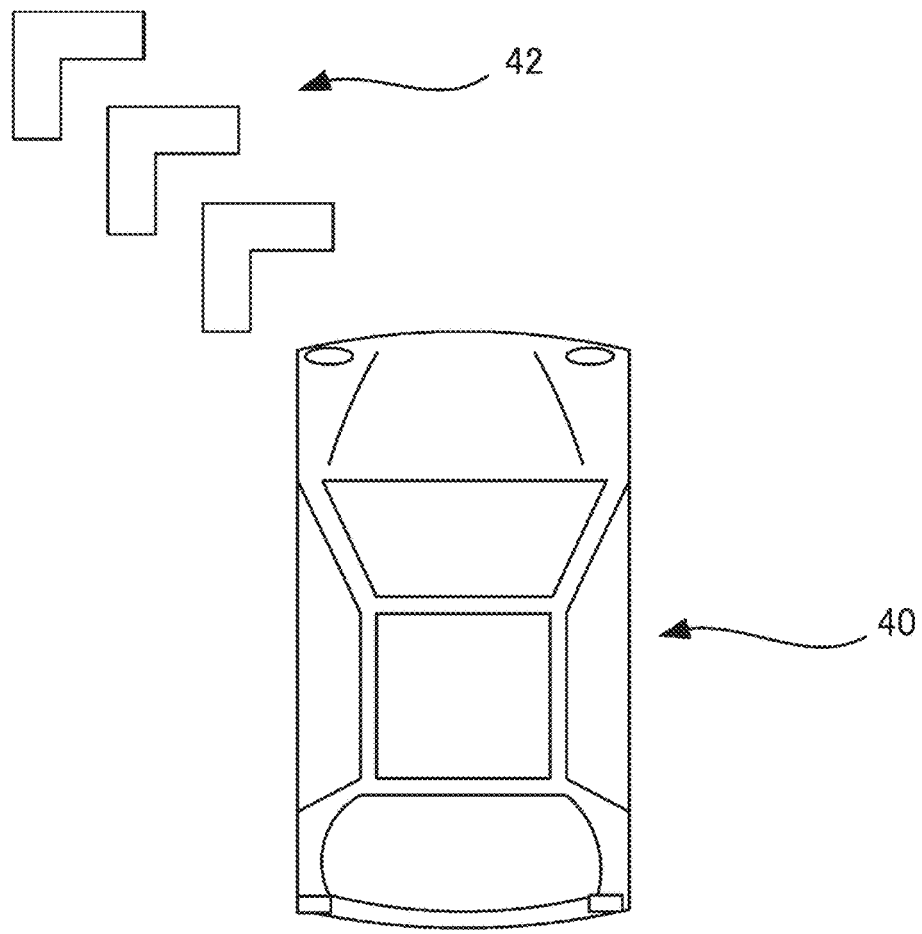
FIG. 2 is a diagram illustrating an example of an indication display (turn indication display) made when a vehicle changes course to the left.

FIG. 2 illustrates an example of an indication display (also referred to as "turn indication display") made on the road surface when a vehicle 40 is going to change course to the left, for example when the turn indicator switch 24 is switched on for changing the course to the left (e.g., left turn). As described above, the turn indicator lamps blink when the turn indicator switch 24 is turned on.

Thus, in the example illustrated in FIG. 2, a turn indication display 42 regarding the direction of travel is drawn on the road surface, in which three inverted V-shaped marks are arranged in a forward left 45-degree direction from the vehicle 40. Thus, vehicles, pedestrians, and the like in the vicinity can see the turn indication display 42 and tell the direction of travel of the vehicle. The turn indication display 42 may be any display such as a line (dashed line or continuous line), a triangle, an arrow, or the like, as long as it is capable of informing others of the direction of travel of the vehicle. Further, the direction of the display for indicating the direction of travel does not have to be 45 degrees, and any angle may be used as long as the direction of travel can be indicated, such as a front left direction, a front right direction, or the like. Note that the turn indicator switch 24 of the vehicle operates as usual. Further, when changing the course to the right (e.g., right turn), the right and left directions are reversed from those in the above description regarding turning left.

Note that various kinds of displays may be employed for indication displays (turn indication display) when changing course in the right or left directions, such as a display that bends to the right, an arrow display 45 degrees to the right, and so forth.

Further, the turn indication display may be performed in accordance with steering. That is to say, the processor 20 can predict the course of the vehicle 40 based on the information from the position detection device 12, the navigation device 14, the camera 16, the sensor 18, and so forth. Accordingly, the turn indication display can be controlled in accordance with this prediction. In particular, when the vehicle is at a point where a course change to the right or left is predicted, and steering corresponding thereto is started, determination can be made that the change in course is being performed as predicted at that point and the turn indication display can be performed.

Start-Traveling Display

Figure 3:
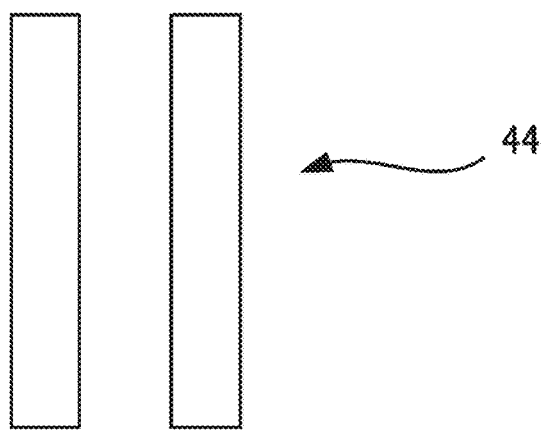
FIG. 3 is a diagram illustrating an example of an indication display (start-traveling display) on the road surface when the vehicle starts traveling forward.
Figure 3:
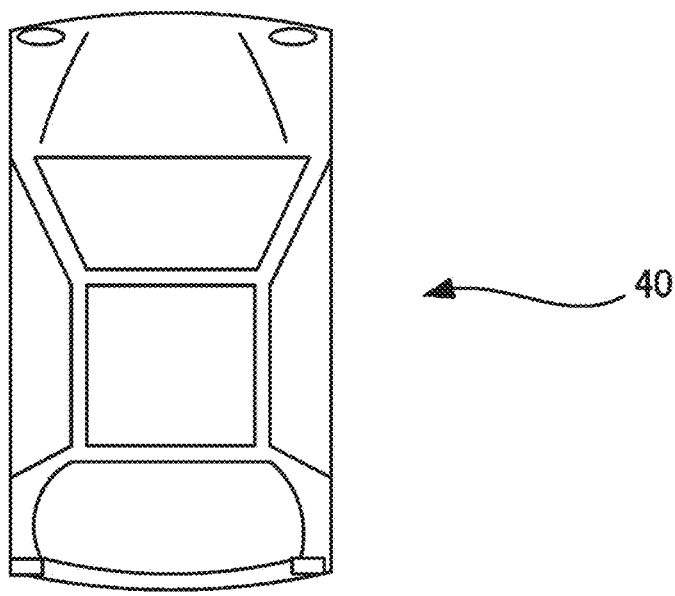

FIG. 3 is a diagram illustrating an example of a start-traveling display 44, which is an indication display made on the road surface when the vehicle starts traveling forward. In the example illustrated in FIG. 3, at the time of starting traveling, the start-traveling display 44 made up of two straight lines (thick lines) is drawn on the road surface forward from the vehicle 40. This can inform others that the vehicle 40 is going to move forward. Note that when in reverse, the same display may be drawn rearward from the vehicle 40. The start-traveling display 44 may be any display as long as it is capable of indicating that the vehicle is about to move, and various kinds of shapes, such as, for example, a straight line, an arrow, an inverted V shape, a triangle, and so forth, can be selected.

Now, description will be made regarding the time of starting traveling. First, when parked in a parking lot or the like, the power switch of the vehicle 40 is turned off, and drive sources such as an engine, a motor, or the like, are turned off. Also, the shift position is in park, and the parking brake is on. When preparing to start traveling, a series of operations is performed, which are turning on the power switch, then depressing the foot brake and shifting the shift position to drive. Thus, drive power from the drive source such as the engine or the motor can be transmitted to the wheels, and the vehicle can start traveling by releasing the foot brake. The time when the vehicle is capable of starting traveling is included in the time of starting traveling.

Also, when waiting at a traffic light or when the vehicle is temporarily stopped on the shoulder of the road, the vehicle is often stopped in a manner that the power switch is left on. In this case, the shift position remains in drive, and the brakes are applied. The time when the vehicle is in this state is included in the time of starting traveling, because the vehicle 40 will start traveling when the brake is released.

At this time of starting traveling, the indication display illustrated in FIG. 3 is drawn on the road surface. This indication display is then maintained until after the vehicle 40 actually begins to move and starts traveling. The indication display is then turned off after the vehicle 40 moves several meters or so, for example.

Note that when the vehicle is stopped and waiting at a traffic light at an intersection, the start-traveling display often cannot be drawn on the road surface due to the presence of a vehicle in front of the vehicle, and in such cases, the start-traveling display may be cancelled.

Drawing Control of Indication Display

Now, the turn indicator switch 24 may be turned on at the time of starting traveling, when the vehicle is to start traveling while turning to the right or to the left. In this case, if two indication displays are both displayed without change, the display tends to be confusing for pedestrians and drivers of other vehicles in the vicinity to understand. In the present embodiment, priority is given to the indication display regarding the right-left direction.

Figure 4:
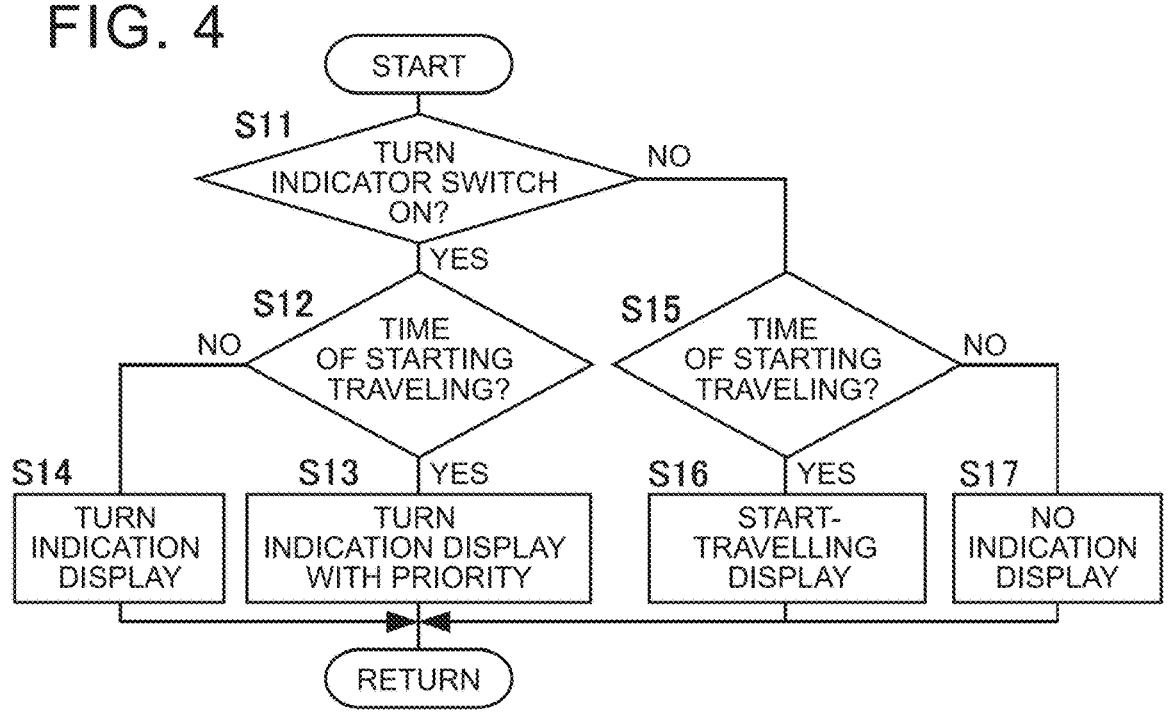
FIG. 4 is a flowchart showing processing for the turn indication display and the start-traveling display.

FIG. 4 is a flowchart showing processing for turn indication display and start-traveling display.

First, determination is made regarding whether the turn indicator switch 24 is on (S11). When YES in the determination of S11, determination is made regarding whether the current state is at the time of starting traveling (S12). When YES in the determination of S12, this means that the turn indicator switch 24 is on and the current state is at the time of starting traveling. In this case, the indication display is drawn on the road surface with priority given to the turn indication display in the right-left direction (S13).

When NO in S12, the turn indicator switch 24 is on, but the current state is not at the time of starting traveling. Accordingly, only the turn indication display is drawn as the indication display (S14).

When the determination is NO in S11, determination is made regarding whether the current state is the time of starting traveling (S15). When YES in the determination of S15, the turn indicator switch 24 is off and the current state is at the time of starting traveling, so only the start-traveling display is drawn on the road surface as the indication display (S16). When NO in the determination in S15, the turn indicator switch 24 is off and the current state is not at the time of starting traveling, and accordingly no indication display is made (S17).

Priority of Turn Indication Display

Figure 5:
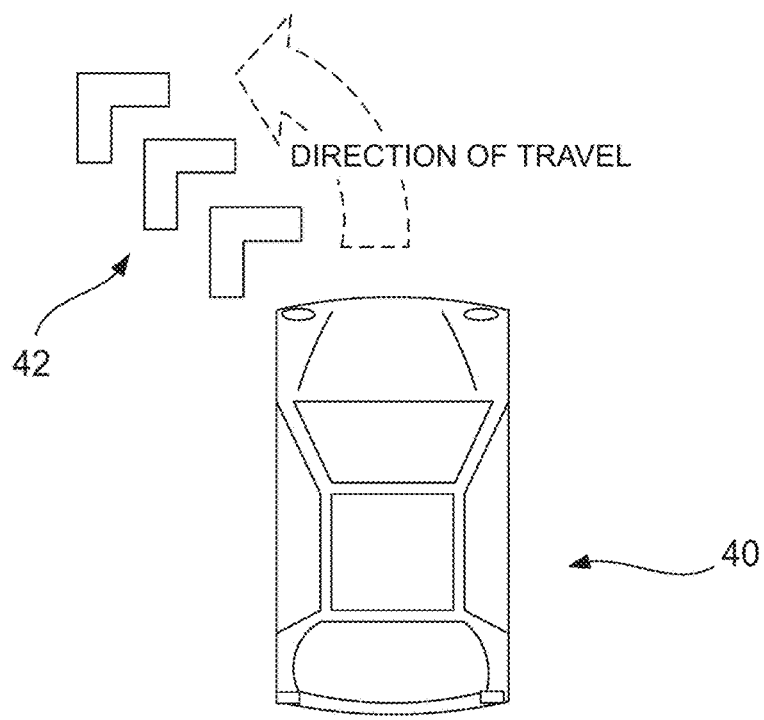
FIG. 5 is a diagram illustrating an example of a priority given to the turn indication display, in which start-traveling display is canceled.

FIG. 5 is a diagram illustrating an example of a priority given to turn indication display, in which start-traveling display is canceled. In FIG. 5, the dashed lines indicate the direction of travel of the vehicle 40, and by displaying only the turn indication display 42 indicating the direction of travel, pedestrians, drivers of other vehicles, and so forth, in the vicinity, can be informed that the vehicle 40 is about to travel toward the left, in an easy-to-understand way. Note that the dashed-line arrow in FIG. 5 indicates the direction of travel of the vehicle 40, and does not represent the display on the road surface.

Figure 6:
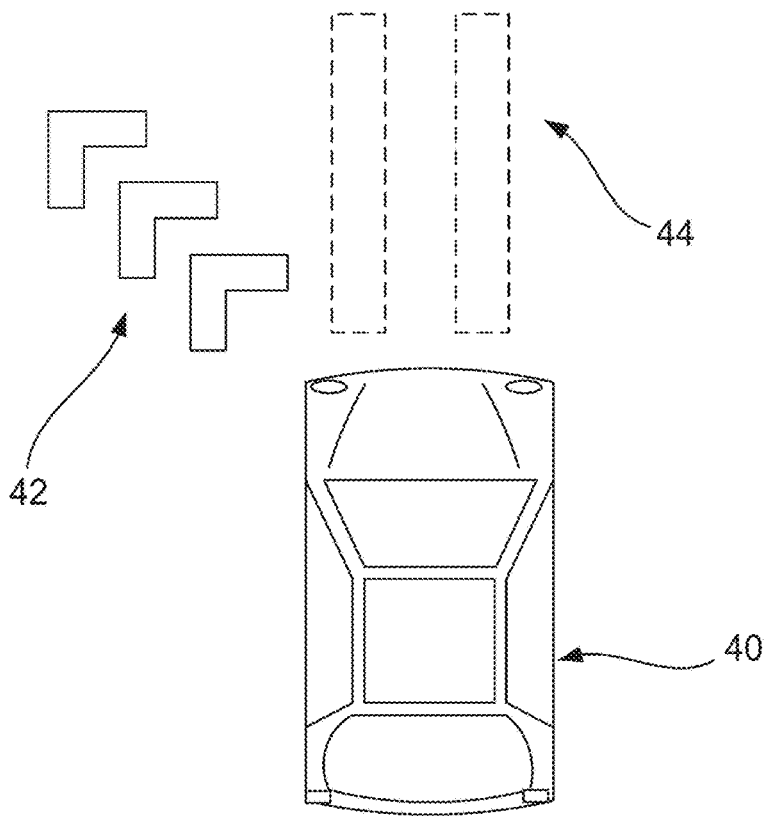
FIG. 6 is a diagram illustrating another example of a priority given to the turn indication display in which the start-traveling display is changed to a less conspicuous display.

FIG. 6 is a diagram illustrating another example of a priority given to turn indication display, in which the start-traveling display 44 is changed to a display that is less conspicuous than the turn indication display 42. The indication display is drawn as a pattern having a predetermined shape, on the road surface, by projection thereof using light. Accordingly, the degree of inconspicuousness of the display is determined by how much the display portion differs from the road surface. That is to say, the degree of inconspicuousness (or the degree of conspicuousness) is determined by how much of a difference there is from the road surface (usually gray-colored) from the viewpoint of any one of brightness, hue, and saturation. For example, weakening light intensity of the start-traveling display reduces the brightness and the display becomes inconspicuous. The brightness of the display can be changed by changing the light emission intensity while keeping the pattern used for the start-traveling display the same. Also, the color of the road surface is often close to gray, and accordingly the turn indication display can be made conspicuous by using color having a different hue, such as red or blue, or a color with high saturation, as a conspicuous color, so that the start-traveling display is conspicuous. On the other hand, using a color with low saturation, especially a color close to gray, enables the start-traveling display to be made inconspicuous.

Furthermore, a blinking display draws more attention than a constant display. That is to say, the degree of conspicuousness of the display can be changed by changing the lighting method such as blinking. By setting the turn indication display to be a blinking display and the start-traveling display to be a constant display, the start-traveling display can be made inconspicuous.

Further, the turn indication display may be made conspicuous by combining the brightness, the saturation, the hue, the blinking, and so forth, described above.

Figure 7:
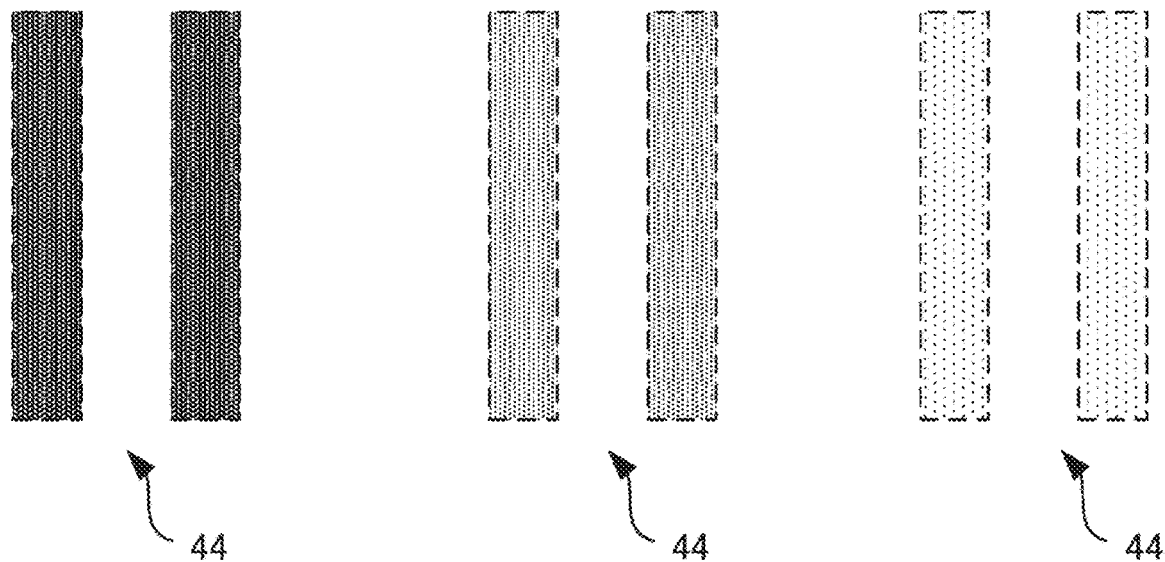
FIG. 7 is a diagram schematically illustrating examples of start-traveling displays with different levels of conspicuousness.

FIG. 7 is a diagram schematically illustrating examples of start-traveling displays, demonstrating three types of displays, of which the leftmost one is the most conspicuous display and the rightmost one is the least conspicuous display. Here, in FIG. 7, the background color is white and accordingly black is conspicuous. However, when drawing using light, the display becomes brighter as the intensity becomes stronger, and accordingly, this does not mean that the blacker the more conspicuous it is, as it would seem from FIG. 7.

Change by Steering Angle

Further, when the start-traveling display is made inconspicuous as illustrated in FIGS. 6 and 7, the start-traveling display may be changed in accordance with the steering angle. Thus, the display can be switched in a plurality of stages, and the light intensity or the display concentration (degree of conspicuousness) can be continuously changed in accordance with the steering angle.

When the steering wheel is operated at the time of starting traveling (for example the steering wheel is turned), the start-traveling display may be cancelled when the steering angle is large, and both may be displayed when the steering angle is small.

Change of Start-Traveling Display

Figure 8:
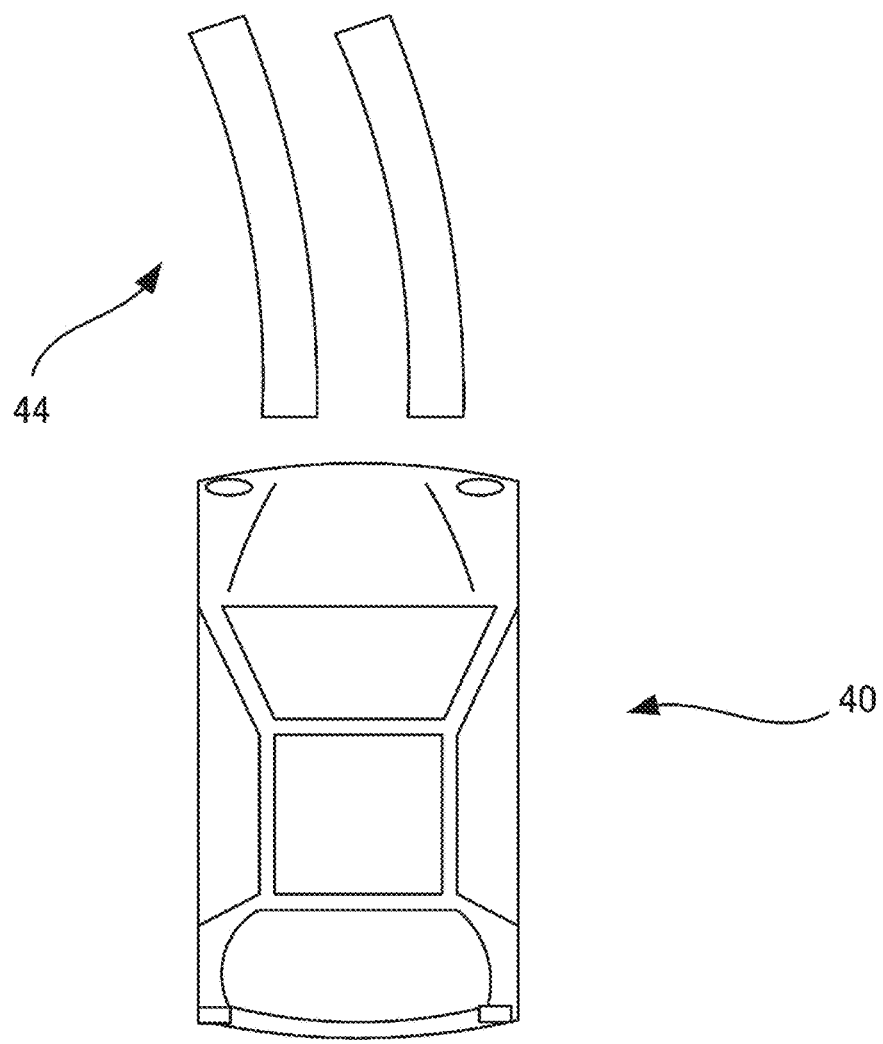
FIG. 8 is a diagram illustrating an example of changing the start-traveling display in accordance with the direction of travel.

FIG. 8 is a diagram illustrating an example of changing the start-traveling display in accordance with the direction of travel. In this example, the turn indicator switch 24 is turned on to the left, and the vehicle travels leftward. Accordingly, the start-traveling display 44 overall is changed to a shape that curves to the left, and those who are in the vicinity are informed that the vehicle will start traveling toward the left.

The degree of the curve may also be changed in accordance with the steering angle, so that the display is closer to the direction of travel of the vehicle 40.

For example, when the steering angle at the time of starting traveling is small, the start-traveling display 44 can be bent toward the direction of travel, and when the steering angle is large, the display can be switched to just the turn indication display 42.

What is claimed is:

1. A vehicular drawing device configured to be installed in a vehicle, the vehicular drawing device comprising a processor configured to draw, using light, an indication display with a predetermined shape on a road surface in a direction of travel of the vehicle, wherein
the indication display includes a start-traveling display that is drawn at a time of starting traveling, and a turn indication display that is drawn when a turn indicator switch is turned on and the direction of travel is to be changed, and
the processor is configured to, in response to the turn indicator switch being turned on at the time of starting traveling, change the start-traveling display to a further start-traveling display having a degree of inconspicuousness different from that of the start-traveling display, and draw the turn indication display and the further start-traveling display at a same time.

2. The vehicular drawing device according to claim 1, wherein, the processor is configured to, in response to a priority being given to the turn indication display at the time of starting traveling, cancel drawing of the start-traveling display and the further start-traveling display.

3. The vehicular drawing device according to claim 2, wherein, the processor is configured to, in response to the priority being given to the turn indication display at the time of starting traveling, change a degree of inconspicuousness in the start-traveling display in accordance with a steering angle.

4. The vehicular drawing device according to claim 2, wherein the processor is configured to draw the start-traveling display as an inconspicuous display by at least one of brightness, saturation, hue, or blinking.

5. A vehicular drawing device that is installed in a vehicle and draws, using light, an indication display with a predetermined shape on a road surface in a direction of travel of the vehicle, the vehicular drawing device comprising a processor, wherein
the indication display includes a start-traveling display that is drawn at a time of starting traveling, and a turn indication display that is drawn when a turn indicator switch is turned on and the direction of travel is changed,
the processor is configured to,
in response to the turn indicator switch being turned on at the time of starting traveling and a steering angle at the time of starting traveling being smaller than a predetermined angle, change a distal end of the start-traveling display to a curve that curves in a direction in accordance with the direction of travel indicated by the turn indicator switch, and
in response to the turn indicator switch being turned on at the time of starting traveling and the steering angle at the time of starting traveling being larger than the predetermined angle, the processor is configured to draw the turn indication display that is different from the start-traveling display with the curve.

6. The vehicular drawing device according to claim 1, wherein, the processor is configured to, in response to a priority being given to the turn indication display at the time of starting traveling, the processor is configured to draw the start-traveling display as an inconspicuous display.

7. The vehicular drawing device according to claim 6, wherein the processor is configured to draw the start-traveling display as the inconspicuous display by at least one of brightness, saturation, hue, or blinking.

8. The vehicular drawing device according to claim 1, wherein the degree of inconspicuousness is determined by a difference in at least one of brightness, saturation, hue, or blinking from the road surface.

9. The vehicular drawing device according to claim 1, wherein the processor is configured to, when the steering wheel is operated at the time of starting traveling,
cancel the start-traveling display and the further start-traveling display in response to a steering angle being larger than a predetermined threshold, and
draw (i) the start-traveling display or the further start-traveling display and (ii) the turn indication display in response to the steering angle being smaller than the predetermined threshold.

* * * * *